United States Patent
Jayasuriya

(10) Patent No.: US 8,754,144 B2
(45) Date of Patent: Jun. 17, 2014

(54) RADIATION CUREABLE HEAT SEAL BLISTER-COATING COMPOSITIONS

(71) Applicant: Rohitha Muthumala Jayasuriya, Princeton Junction, NJ (US)

(72) Inventor: Rohitha Muthumala Jayasuriya, Princeton Junction, NJ (US)

( * ) Notice: Subject to any disclaimer, the term of this patent is extended or adjusted under 35 U.S.C. 154(b) by 0 days.

(21) Appl. No.: 13/652,453

(22) Filed: Oct. 15, 2012

(65) Prior Publication Data

US 2014/0102935 A1   Apr. 17, 2014

(51) Int. Cl.
   *C08F 2/46* (2006.01)
   *C08G 61/04* (2006.01)

(52) U.S. Cl.
   USPC .................................................. 522/1; 520/1

(58) Field of Classification Search
   CPC ......... B29C 59/16; B29C 65/36; G06G 5/062
   USPC ................................................... 522/1; 520/1
   See application file for complete search history.

(56) References Cited

U.S. PATENT DOCUMENTS

2011/0212324 A1 *   9/2011   Tokunaga et al. ............. 428/327

FOREIGN PATENT DOCUMENTS

| JP | 2006-342222 | * 12/2006 |
|----|-------------|-----------|
| JP | 2007-268986 | * 10/2007 |

* cited by examiner

*Primary Examiner* — Ling Choi
*Assistant Examiner* — Jessica E Whiteley

(57) ABSTRACT

A heat-sealable coating composition curable by actinic radiation containing a monofunctional (meth)acrylate monomer, a multifunctional (meth)acrylate monomer, vinyl modified diene block copolymer, a diene block copolymer, a vinyl modified diene, and mixtures thereof, and at least one photoinitiator. The heat sealable resin is dissolved or finely dispersed in said monomer mixture. Also disclosed is a blister pack formed by the heat sealing the cured composition.

16 Claims, No Drawings

RADIATION CUREABLE HEAT SEAL BLISTER-COATING COMPOSITIONS

FIELD OF THE INVENTION

The present invention relates to radiation curable compositions suitable for heat sealing blister-packs to blister-board substrates and methods thereof.

BACKGROUND OF THE INVENTION

Blister-packs are carded packaging where goods such as toys, hardware, dry pharmaceuticals, hard candy and electrical items are contained in between a specially made paperboard and clear pre-formed plastic cells such as poly vinyl chloride (PVC) and poly ethylene terepthalate (PET). The pre-formed plastic cell is affixed to the card using heat and pressure to activate a blister-coating coated on paperboard substrates. The adhesive bond formed between the paperboard and the plastic blister-is strong enough so that the blister-pack may hang on a peg. The blister-pack is teared open by hand to access the item packed inside. Solvent-based blister-coatings are used as they provide gloss to the printed material on the paper board and these coatings suffer the disadvantages of having high volatile organic contents (VOCs).

Water-based blister-coatings have been developed that have low VOCs. Disadvantages of these coatings are longer drying times and higher energy is required to evaporate water contents of 40-60% present in coating compositions. Also these solvent based coatings have poor gloss characteristics. Furthermore, resins and plasticizers are added to improve adhesion and reduce the block resistance of these coatings.

Given the above it would be advantageous to develop radiation cured blister-coatings that are heat sealable and overcome the limitations of water based blister-coatings and have low to no VOC's.

SUMMARY OF THE INVENTION

Accordingly disclosed herein is a heat-sealable coating composition curable by actinic radiation comprising:
a. 70 wt % to 99 wt % based on the total weight of said composition, a monomer mixture selected from a member of the group consisting of a monofunctional (meth)acrylate monomer, a multifunctional (meth)acrylate monomer, and mixtures thereof;
b. 0.1 wt % to 30 wt % based on the total weight of said composition, a heat sealable resin selected from a member of the group consisting of a vinyl modified diene block copolymer, a diene block copolymer, a vinyl modified polybutadiene, and mixtures thereof, wherein said heat sealable resin is dissolved or finely dispersed in said monomer mixture;
c. 1 wt % to 30 wt % based on the total weight of said composition, at least one photoinitiator.

The composition further comprises metal-oxide nanoparticles selected from a member of the group consisting of zinc oxide, titanium dioxide, magnetite, silicon dioxide, cerium oxide and mixtures thereof.

The composition is coated on a blister-board substrate and cured and the cured coating is heat-sealed under pressure and temperature to a blister-cell plastic substrate. Also disclosed is a method of making a heat-sealable coating comprising contacting the coating composition with blister-board and curing said coating by ultraviolet (UV) radiation. Also disclosed is a blister-pack formed by heat sealing the UV cured coating composition.

DETAILED DESCRIPTION OF THE INVENTION

The following definitions are provided to aid in understanding the invention.

Blister-Packs

Components of a typical blister-pack are: printed blister-board or card; the blister-coating present on the printed blister-board or card; and the plastic blister-cell. In a sealing process, the coated blister-board and the plastic blister-cell are affixed to each other by heat sealing conditions by applying pressure and heat. The softening of the plastic blister and the blister-coating allow the formation of fiber tearing bonds of the blister-pack.

Blister-Board

Blister-board is specially produced solid bleached sulfate paperboard stock of low density that are designed to provide good fiber tearing bonds when effectively heat-sealed to a plastic blister-cell. Blister-boards are clay coated on one side to accept various forms of printing and heat sealable coatings. When fold-over blister-cards are used, blister-board is clay coated on both sides. The Blister-board caliper typically ranges from 16 to 24 pt. Compositions disclosed herein are coated directly on the blister-board and cured to form a tack-free blister-coating. The resultant tack-free blister-coating is then affixed to the plastic blister-cell by heat sealing using pressure and temperature. In this specification, blister-card and blister-board are referred to interchangeably to mean the substrate to which the coating is applied and heat sealed to the plastic blister-cell.

Blister-Coating

Blister-coating is the coating that is applied on the blister-board and cured by actinic radiation. The uncured blister-coating composition is applied by conventional coating methods used in the art. The applied coating is cured using actinic radiation. The blister-coating referred throughout the specification is also referred to as the heat sealable coating. In this specification the one form of actinic radiation used to cure the heat sealable coating composition is UV curing. Blister-coating compositions must be effectively cured to a tack free state before the coated blister-boards are stacked. This is to prevent blocking during stargaze and handling prior to heat sealing. Further, inks used on blister-boards should be free of waxes, silicones, or other agents that might compromise the heat sealing of blister-coatings. Inks should also be formulated to withstand heat sealing temperatures.

Blister-Cell

Blister-cell is the thermoformed cell that is heat sealed to the cured compositions of the heat-sealable coating present on blister-board or blister-cards. Typically the blister-cell is a transparent plastic and looks like a blister as it rises above the blister-board substrate when sealed to its finished form. Thickness of the plastic blister-cell ranges from 7.5 to 10 mil. Blister cells are thermoformed and plastics with excellent clarity are preferred and the plastic must be conducive to thermoforming and display flexibility during thermoforming. Suitable plastics for blister cell substrates are PVC, polyethylene terepthalate (PET), polyethylene terepthalate containing glycol (PET-G), PET/A, polyolefins such as polypropylene (PP) and polyethylene (PE), styrene and cellulose plastics and the plastic blister-cell could be laminates of one more of these materials. PET and PET-G are available from Eastman Chemical Company, Kingsport, Tenn., USA.

Heat Sealing

Heat sealing is defined as a combination of temperature, time, and pressure required to affix the plastic blister-cell to the blister-board substrate that have been coated with the heat-sealable coating composition and cured by actinic radiation. Temperatures typically in the range from about 180° C. to 220° C., pressures from about 40 to 70 psi and dwell times from about 2 to 5 seconds are used in heat sealing. The sealing of a blister-board and the plastic blister-cell is accomplished by conducting sufficient heat through the blister-board substrate typically from the opposite side from where the blister-coating is applied. As blister-boards are made of paperboard, an insulator, and thick blister-boards require higher temperatures and dwell times for blister-coating to a form a good seal. Some sealing is also done by techniques that induce heat from the plastic blister-cell side. Generally, fiber tearing bonds are obtained when the temperature at the interface between the blister-coating and the plastic blister-cell interface reaches about 95° C. to 100° C.

Heat Sealable Resin

Heat sealable resin is any resin that aids in the formation of a fiber-tearing bond between the plastic blister-cell and the blister board substrate in the radiation cured blister-coating. The heat sealable resin typically contains double bonds that are radiation curable. During heat sealing, the heat sealable resin present in the cured blister-coating facilitates wetting and mixing of the softened plastic blister-cell with the cured blister-coating. The heat-sealable resin consists of a member selected from the group consisting of vinyl modified diene block copolymer, a diene block copolymer, vinyl modified butadiene copolymer, and mixtures thereof. Embodiment heat sealable resins range from 0.1 wt % to 30 wt %, 0.1 wt % to 20 wt %, 0.1 wt % to 15% wt %, 0.1 wt % to 10 wt %, 0.1 wt % to 5 wt % and 0.1 wt % to 3 wt % based on the total weight of the coating composition. The heat sealable resin is dissolved or finely dispersed in monomer mixture used in the coating composition.

Embodiment cured coatings containing the heat sealable resins are not tacky and exhibits fiber-tearing bonds when heat sealed, therefore, is appropriate for blister-pack manufacturing.

UV Curing

The term radiation curing refers to UV and electron beam curing. In UV curing the reaction of unsaturated double bonds within a molecule or with another molecule occurs in the presence of photoinitiators. The curing reactions include polymerization, cross-linking and other grafting mechanisms commonly known in the art. Incident light energy is absorbed by the photoinitiator which is converted to free radicals and free radicals attack the acrylic double bonds, causing curing. UV curing is preferred than electron beam curing because of its versatility and reduced capital equipment required to convert from solvent-based coatings manufacturing operations to UV cured manufacturing operations.

Block Resistance

Block resistance is the ability of a coating to resist sticking to another surface. Blocking occurs when cured blister-coatings stick to each other during stacking. Blocking may occur at much lower temperature, humidity, and pressure conditions than heat seal conditions and fold over cards used in blister-packs are particularly susceptible to blocking. ASTM D4946 can be used to obtain block resistance of the cured blister-coatings.

Gloss

Gloss is associated with the capacity of a surface to reflect light. ASTM D523-08 can be used to measure gloss and gloss is typically measured using a gloss meter and various angles. Measurements at 60° angle can be used to measure the gloss of cured blister-coatings. Higher values of gloss units typically correspond to high gloss coatings.

Tack

Tack is ability to grab on to a substrate and is dependent on the softness of the coating. Finger touch may be sufficient to gauge the tackiness of a cured blister-coating and tackiness can be measured by several methods used in the art such a polyken probe tack. Choice of a heat sealable resin in the radiation curable coating composition should not increase the tack of the coating composition when cured to form a heat sealable coating. Further, tackifiers that increase the tack of coatings are not suitable in the coating compositions.

Vinyl Modified Diene Block Copolymer

The heat sealable resin comprises a vinyl modified diene block copolymer. The vinyl modified diene block copolymer comprising at least two blocks wherein the first block is a polyvinyl aromatic (styrenic) endblock and the second block is a polydiene mid-block that has been 1,2-vinyl modified, i.e., the resultant 1,2-vinyl double bonds dangle on polydiene mid-blocks. These dangling double bonds, or the vinyl functionality are at a sufficient concentration such that the vinyl modified diene block copolymer crosslinks substantially through such vinyl functionality upon exposure to a radiation source preferably UV. The polyvinyl aromatic block in the vinyl modified diene block copolymer is typically styrene. However, various alkyl-substituted styrenes, alkoxy-substituted styrenes, vinyl napthalene, alkyl-substituted vinyl napthalenes and the like are also suitable compounds for formation of the polyvinyl aromatic block. The polydiene block may be formed from a variety of conjugated diolefins containing from about 4 to about 24 carbon atoms, such as those disclosed by U.S. Pat. No.5,382,604, which is incorporated herein by reference. Typically, the conjugated diene is 1,3-butadiene and/or isoprene. The conjugated diene block is typically modified such that sufficient vinyl functionality is incorporated.

The structure of the vinyl modified diene block may be linear, multiblock, radial, multi-arm, or grafted in structure. Preferably, the vinyl modified diene block copolymer is a branched asymmetric molecule containing styrene-butadiene (SB) and homopolybutadiene arms having the general formula $(SB)_2B_2$ wherein the butadiene midblock has been 1,2-vinyl modified. Information concerning the synthesis, physical properties, compatibility with other ingredients, etc. is known from U.S. Pat. No. 5,804,663, incorporated herein by reference. A preferred $(SB)_2B_2$ block copolymer is Kraton® D-KX-222C. Vinyl modified styrene-butadiene-styrene (SBS) block copolymers such as vinyl modified random styrene-butadiene multiblock (S-B-S-B-S) block copolymers may also be employed provided that the polydiene midblock contains a sufficient concentration of the vinyl functionality that crosslink upon exposure to ultraviolet radiation. Styrene contents of the vinyl modified diene block copolymers are 10 to 50 wt % and vinyl contents range from 35 to 70 wt %, and the molecular weights of these block copolymers range from 100,000 to 500,000 daltons. Vinyl modified random styrene-butadiene multiblock (S-B-S-B-S) block copolymer having vinyl content ranging from about 10 wt % to about 50 wt % sold under the trade designation SR-8272 and SR-8273 by Firestone Polymers also could be used.

The amount of the vinyl modified diene block copolymer employed in the coating composition may depend on the solubility of the monofunctional (meth)acrylate monomer or mixture of multifunctional (meth)acrylate monomer used in the composition to produce fiber tearing bonds. Typically, the coating composition comprises from about 0.1 wt % to about 15 wt %. Preferably from about 0.3 wt % to about 10 wt %, more preferably from 1 wt % to about 5 wt % of the vinyl modified diene block copolymer, based on the total weight of the coating composition.

Diene Block Copolymers

Diene block copolymers may be employed alone or in combination with vinyl modified diene block copolymer. Suitable commercially available diene block copolymers include the Kraton® D and G series block copolymers from Kraton Polymers, Houston, Tex., USA; Europrene® T block copolymers from EniChem, Houston, Tex., USA and Vector® block copolymers from Exxon (Dexco), Houston, Tex., USA.

The amount of the diene block copolymer employed may depend on the solubility of the monofunctional (meth)acrylate monomer or mixture of multifunctional (meth)acrylate monomer used in the composition to produce fiber tearing bonds. Typically, the coating composition comprises from about 0.1 wt % to about 15 wt % of the diene block copolymer. Embodiment compositions comprise from about 0.3 wt % to about 10 wt %, and from 1 wt % to about 5 wt % of the diene block copolymer, based on the total weight of the coating composition.

Vinyl Modified Diene Polymer

Vinyl modified diene polymer can be employed alone or in combination with vinyl modified diene block copolymer. The vinyl modified butadiene polymer can include vinyl modified isoprene polymers. Suitable vinyl modified butadiene polymers can have a molecular weight ranging from about 500 to about 500,000 daltons, and preferably within the range from about 1,000 to about 70,000 daltons. Embodiment coating compositions contain 0.1 wt % to about 10 wt %, 0.2 wt % to about 5 wt % vinyl modified diene polymer based on the total weight of the coating composition. Suitable vinyl modified polybutadienes such as acrylated butadienes are available from Sartomer Chemical Company, Exton, Pa., USA.

Monomers

Monomers used in radiation curable heat sealable coating compositions comprise acrylated and methacrylated monofunctional products containing at least one double bond that can be radiation cured. Monomers having high glass transition temperatures are suitable for the present invention.

As a person skilled in the art may recognize that a mixture of di and tri-functional monomers could be used to achieve a sufficient hardness that is required to produce a cured tack free non blocking surface.

The monomer mixture that is soluble or finely dispersed so as to produce coatable compositions. Monomer mixtures that are soluble and/or finally dispersed in the vinyl modified block copolymers as described hereinabove are suitable. This is due to ease of application when low viscosities are obtained. It is found that isobornyl acrylate, a typical nonpolar monomer, can adequately solubilize vinyl modified diene block copolymers, and mixtures of diene block copolymers employed herein, such mixtures being characterized as having the viscosities required.

In an embodiment, the heat sealable resin is dissolved in the monofunctional monomer and the multifunctional monomers are added to provide for curing speed and hardness. Liquid monomers or semi solid monomers that produce low viscosities can be used. Suitable monomers include monomers that produce high glass transition and cyclic aliphatic groups. These cyclic aliphatic groups may have double bonds such as cyclohexene. Any monomer mixture that can solubilize or disperse the heat sealing resin and is curable can be used.

Suitable monofunctional acrylates for use in the radiation-curable formulations include esters of acrylic and methacrylic acid having the general structural Formula I:

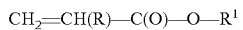

wherein R is hydrogen or methyl and $R^1$ is a linear or branched alkyl group containing one to 22 carbon atoms, linear or branched alkyoxy group containing one to 22 carbon atom, phenyl, alkyl phenyl group, phenoxy group.

Suitable monofunctional (meth)acrylates can be selected from a member of the group consisting of cyclic aliphatic monofunctional (meth)acrylates, linear alkyl monofunctional acrylates, branched alkyl monofunctional (meth)acrylates, aromatic monofunctional (meth)acrylates and mixtures thereof. These include but not limited to isobornyl acrylate, isobornylmethacrylate, isodecyl acrylate, isooctyl acrylate, lauryl acrylate, lauryl methacrylate, octadecyl acrylate, stearyl acrylate, aliphatic methacrylate, stearyl methacrylate, tetrahydrofuryl acrylate, tridecyl acrylate, methyl methacrylate, aliphatic acrylate, butyl acrylate, 2-phenoxyethyl acrylate, stearyl methacrylate, and tridecyl methacrylate, 3,3,5-trimethylcyclohexyl acrylate, dicyclopentadiene acrylate, cyclic trimethylol propane formal acrylate, aliphatic acrylate, acrylate ester, and mixtures thereof. These monomers are available from Sartomer Chemical company and Cytech Surface Specialities Inc., Smryna, Ga., USA.

Exemplary aliphatic acrylate (Ebecryl® 113) is available from Cytech Surface Specialities Inc., Smryna, Ga., USA, and acrylate ester is available from Sartomer Chemical Company.

The monofunctional (meth)acrylate monomer can contain ethoxylated and or propoxylated (meth)acrylate monomers. Suitable ethoxylated or propoxylated (meth)acrylate include ethoxyethoxy acrylate. An embodiment monomer mixture can contain metallic monomethacrylate and the zinc diacrylate and zinc methacrylate available from Sartomer Chemical Company, Exton, Pa., USA.

Multifunctional (meth)acrylate monomers can have functionalities that are difunctional, trifunctional, tetrafunctional, pentafunctional acrylate and hexafunctional or higher functionalities.

Suitable multifunctional (meth)acrylate monomers can have the following formula.

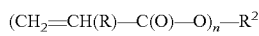

where R is methyl or hydrogen, n is 2,3,4 and $R^2$ is a linear or branched alkyl or alkoxy group containing one to 22 carbon atoms, a hexanediol group, tripropylene glycol group, trimetholpropane group, pentaerythritol group.

Suitable multifunctional (meth)acrylates are selected from a member of the group consisting of 1,6-hexanediol di(meth)acrylate, tripropylene glycol di(meth)acrylate, trimethylolpropane trimethacrylate, pentaerythritol tri-acrylate, acrylated dipentaerythritol, ditrimethylolpropane tetra acrylate, polyether tetra acrylate, pentaerythritol tri-tetra acrylate, and mixtures thereof.

An embodiment monomer mixture contains isobornyl acrylate, isobornyl methacrylate and a multifunctional (meth)acrylate monomer selected from a member of the group consisting of 1,6-hexanediol diacrylate, tripropylene glycol diacrylate, trimethylolpropane tri(meth)acrylate, pentaerythritol triacrylate, pentaerythritol tri-tetraacrylate, and mixtures thereof.

Photoactive Initiators:

In UV curing, one or more photoactive initiators are added to the coating composition. Representative examples include, but are not limited to aldehydes, benzaldehyde, acetaldehyde, and their substituted derivatives; ketones such as acetophenone, benzophenone, and their substituted derivatives, particularly the 4-alkylbenzophenones wherein the alkyl group has 1 to 18 carbon atoms; quinones such as benzoquinone, anthraquinone, and their substitutes derivatives; thioxanthones, such as 2-isopropylthioxanthone and 2-dodecylthioxanthone; and certain chromophore-substituted halomethyl-sym-triazines, such as 2,4-bis(trichloromethyl)-6-(3',4'-dimethoxyphenyl)-sym-triazine.

Another suitable type of photoinitiator that can be used in the coating compositions is the "alpha cleavage type" photoinitiator. This photoinitiator is particularly beneficial when other unsaturated species such as acrylated oligomers and monomers are used. Commercial examples of alpha cleavage type photoinitiators known in the art include Irgacure® 184, Irgacure® 651, and Darocur® 1173, available from Ciba Speciality Chemicals, Hawthorne, N.Y., USA. Suitable radical type photoinitiators include acylphosphine oxides, bisacrylphosphine oxides, and mixtures thereof, and blends in which they are included. Commercially available examples include Irgacure® 819, Irgacure® 1800, and Irgacure® 1850 from Ciba Speciality Chemical Company, Hawthorne, N.Y., USA; and Lucirin® TPO from BASF Corporation.

Photoactive initiators are present in the coating composition at a concentration from about 1 wt % to about 15 wt %. Embodiment compositions range from about 2 wt % to about 12 wt % and more preferably from about 5 wt % to about 10 wt %, based on the total weight of the coating composition. The photoinitiator can also contain an adjuvant. Exemplary adjuvants are monofunctional, difunctional and trifunctional amines and alkanolamines. Exemplary amines are triethanolamine. and triethylamine. Adjuvants can vary from 0.5% to 10% by weight of the coating composition.

Coating compositions are cured by a source of actinic radiation of sufficient energy (i.e., wavelength ranges) to generate free radicals incident upon the photoinitiators. Suitable wavelength ranges for the photoinitiators disclosed above is 400 to 250 nm. The amount of radiant energy density desired to crosslink the coating composition is from about 25 to about 200 mJ/cm$^2$, (for UVA, from about 315 nm to about 400 nm) and from about 40 to about 200 mJ/cm$^2$, (for UVA, from about 315 nm to about 400 nm), as measured with a Power-Puck™ radiometer manufactured by EIT. Details of the photocure process are disclosed in U.S. Pat. Nos. 4,181,752 and 4,329,384 are incorporated herein by reference. Embodiment compositions can have Brookfield viscosities less than about 8,000 cps; less than about 6,000 cps at about room temp; less than about 4,000 cps; less than about 2,000 cps; and less than about 10,00 cps can be used in coating the composition on blister-board. If required the coating composition can be heated to allow for application viscosities by heating to a temperature of no greater than about 80° C.; no greater than about 60° C. and no greater than about 50° C.

Nanoparticles

The coating composition may further comprise metal-oxide nanoparticles. Suitable metal-oxide nanoparticles include mixed metal-oxides and their hydrates. The particle size of the metal-oxide nanoparticles is the mean particle size and these nanoparticles may be spherical, polyhedral and or any shape that is within the nanosize range. The metal-oxides can be crystalline or amorphous. Metal-oxide nanoparticles that can be used in the composition are chosen such that the gloss of the coating after cure is maintained. Further, these nanoparticles are finely dispersed within the coating. Metal-oxide nanoparticle diameters less than 100 nm that is transparent in the wavelengths of visible light are preferred to maintain gloss. Suitable metal-oxide nanoparticles are zinc oxide, titanium dioxide, cerium oxide, iron oxide and hydroxyapatite. Metal-oxide nanoparticles with a mean particle size (or a mean particle diameter) less than 200 nm, and 100 nm or smaller can be used. Replacement of the metal nanoparticles with average particle sizes larger than 200 nm in the range 200 nm to 500 nm can be made and this replacement is from about 10 wt % to about 40 wt % by weight percent of the nanoparticles present in the coating composition. The particle size is preferably determined by ultrafine particle analyzer method, for example by laser light back scattering. Suitable metal-oxide nanoparticles as supplied from Alpha Aesar Company, Ward Hill, Mass., USA, can be used in coating compositions in amounts of 0.5 wt % to about 3 wt % based on the total weight of the coating composition. As described in the prior art, metal-oxide nanoparticles that are surface treated can be used.

Certain embodiment coating compositions contain metal-oxide nanoparticles that are added to the coating composition and finely dispersed. Alternatively, metal-oxide nanoparticles are dispersed in the monofuctional (meth)acrylate monomer, multifunctional (meth)acrylate monomer for example di-functional (meth)acrylate monomer, or tri-functional (meth)acrylatemonomer or mixtures containing block copolymer resin dissolved in the monomer mixture. The metal oxide particles can be added directly to the coating composition, or could be added portionwise. In an embodiment, the nanoparticles are dispersed in a monofunctional acrylic monomer solution or monomer mixture containing the heat sealable resin. When metal-oxide nanoparticles are dispersed in an acrylic monomer solution of containing the heat sealable resin, it is contemplated that clusters having particle size greater than 200 nm that scatter visible light is minimized. It is contemplated that metal-oxide nanoparticles are finely dispersed in the monomer/heat-sealable styrene-block copolymer solution. This can prevent settling of the metal-oxide nanoparticles as the viscosity of the solution is increased. For coating compositions containing nanoparticles, amounts of photoinitiators, and curing energies may be adjusted to allow for sufficient curing of the coating composition.

Additives

As is known in the art, various other components can be added to reduce the tack, modify color, odor, etc., of the coating composition. Additives such as antiblock additives, pigments, and fillers, can also be included in the formulations. Additives should be relatively inert and have negligible effects upon the properties contributed by the heat sealing polymer and/or nanoparticles present in the composition. Inks used on the coatings are generally free from waxes or other agents which compromise adhesion to the plastic blister-cell. Amount of additives could vary from 0.1 wt % to 5 wt % based on total weight of the coating composition.

Processing Methods and Properties

The blister-coating compositions can be applied using methods well known in the art including knife coating, roll coating, gravure coating, flexographic, pattern coating and curtain coating. In an embodiment, antilox roll can be used to coat the compositions. The coating method is chosen such that cured coating weights from about 0.6 to 1.0 lbs/1000 sq.ft, from about 0.6 to 0.9 lbs/1000 sq.ft, and from 0.6 to 0.8 lbs/1000 sq. ft are obtained. The blister-coatings compositions can be coated on blister-board substrates that are one side coated are available from Smurfit-Stone Corporation 20-24 gauge.

Radiant energy density and thus, the line speed for sufficient curing depends on the composition and coating weight of the blister-coating applied on the blister-board substrates.

Typically in UV curing, the number of UV lamps required to cure is proportional to the line speed of the coating process. As an example, if a is formulated for a cure speed of 50 feet per minute with one lamp, then three lamps are required to achieve cure speeds of 150 feet per minute. For blister-coatings of about 0.6-0.8 lbs/1000 sq. ft the UV coating compositions are sufficiently cured at line speeds ranging from about 300 ft/min to about 500 ft/min using 2×600 W lamps. Coating compositions disclosed herein can be used in line applications where higher productivity can be obtained by using in-line printing of the blister-board and one coat application and curing of the blister-coating compositions. Additionally, due to fast curing conditions the heat sealing can also be performed on-line.

Cured blister-coatings compositions can be heat sealed under conditions where the sealing heat is driven from the opposite of the blister-coated side of the blister-board. Cured blister-coating compositions can be heat sealed to the blister-plastic cells to give fiber-tear. During heat sealing, the UV cured blister coating adheres to the blister cell plastic substrate which softens and flows during application of temperature and pressure. An important aspect is that the heat-sealable resin facilitates wetting of the UV cured blister coating with softened plastic substrate during heat sealing. Embodiment heat sealable resins comprising styrene-butadiene block copolymer resin present in the cured composition are suitable as the solubility parameters and surface tensions are close in values to the plastic substrates. These solubility parameters and surface tensions of heat sealable resins are shown in Table 1. In addition, the styrene-butadiene block copolymer containing pendant 1,2-vinyl double bonds from the butadiene block becomes an integral part of the coating polymer network during radiation curing of acrylic monomers.

Heat sealed cured blister-coatings having fiber tear-bonds can maintain good seals with the plastic blister-cell under stress when heavy products are contained within the cell. This can happen under extreme heat and cold conditions encountered during storage. Additionally the cured blister-coatings do not block when stacked together under hot and humid conditions encountered during transport and warehousing.

In certain embodiments, the gloss of the coatings is from 80 to 95 units for about 0.5 to 0.8 lbs/1000 sq ft of coated material. Generally gloss for the water based coating is about 55 to 65 units at 60 degree angle and gloss is increased by applying of the coating twice off-line and referred to as double bumping. Such double bumping generally results in increase of gloss units of about 5 to 10 points. Comparatively, the gloss for the solvent based coating is about 60 to 80 units at 60 degree angle.

Embodiment UV cured blister-coatings can have gloss values ranging from 80 to about 95 units measured at 60 deg angle. These embodiment compositions are heat sealed at temperatures of 180° C. to 220° C., pressure of 40 to 70 psi, and a dwell time of 2-5 seconds. The plastic blister-cell interface temperature is about 95° C. to 100° C.

Certain embodiment compositions containing metal-oxide nanoparticles can be UV cured to prevent blocking. Metal-oxide nanoparticles can function as non-locking agents that prevent the blister-board from adhering to each other as result of surface hardening. Nanoparticles present in the coating formulation increases the surface area available for ionic reactions to facilitate formation of 15 nanostructures during curing reactions. These nanostructures can increase surface hardness and prevent the blister board from sticking to each other. Nanostructures can also provide instantaneous anchoring of the plastics to the coating matrix during heat sealing. For example, metal-oxide nanoparticles such as ZnO and TiO2 can form ionic or acid-base interactions with the polar groups 20 chlorine (CI) groups of PVC plastics and carbonyl groups of PET plastics. This can occur when the coating plastic-interface reaches about 90 to 110° C., which is the softening point of the plastics. Another embodiment containing metal-oxide nanoparticles can obtain dwell times less than 2 seconds suitable for fast production and efficient heat sealing. It is believed that these interactions allow 25 the nanostructures to achieve heat sealing conditions with dwell times of less than 2 seconds for the fast manufacturing of blister packages.

TABLE 1

| Surface Energies of plastic substrates | | |
|---|---|---|
| | Solubility Parameter ($\delta$) | Surface Energy ($\gamma c$) |
| PET | 20.8 | 39.0 |
| PVC | 20.0 | 37.9 |
| Polyethylene | 17.6 | 31.6 |

$\delta$: Total Hansen solubility parameter (square root of the sum of squares of the average values for dispersion, polar, and hydrogen bonding components), in $MPa^{1/2}$ (equivalent to joules/cubic centimeter; $2.0455 \times (cal/cc)^{1/2}$) @ 20-25° C.(293.15-298.15 K). All data from *Hansen Solubility Parameters: A User's Handbook*, 2nd Ed., C. M. Hansen, CRC Press, BocaRaton, FL, 2007.
$\gamma c$: Critical surface tension in mJ/m2 (equivalent to dynes/cm).

Embodiment compositions containing higher amounts of metal oxide nanoparticles, or replacement of nanoparticles in the range of 200-400 nm can be employed to obtain dwell times less than 2 seconds. Embodiment coating compositions can comprise metal-oxide nanoparticles selected from the group consisting of zinc oxide, titanium dioxide, magnetite, cerium oxide and mixtures thereof. Certain embodiments can contain zinc oxide nanoparticles.

Further advantages of zinc oxide are the thermal stabilization of plastics such as PVC, antistatic properties of the plastics, and fungistatic properties.

EXAMPLES

The following examples are prepared by mixing the ingredients in the following table to form heat sealable coating compositions.

| | Example 1 | | Example 2 | |
|---|---|---|---|---|
| Component | Weight (g) | Weight (%) | Weight (g) | Weight (%) |
| Kraton ® D-KX-222C | 10 | 11.3% | 0.11 | 0.6% |
| Isobornylacrylate | 60 | 66.1% | 6.6 | 38.9% |
| Ethyleneoxide-trimethylolpropane triacrylate | — | — | 8.0 | 47.3% |
| Irgacure ®1184 | 10 | 11.3% | 1.11 | 6.5% |
| Darocur ®1173 | 10 | 11.3% | 1.11 | 6.5% |
| Total | 90 | 100% | 16.93 | 100% |
| Heat-sealing characteristics | Good/fiber-tear | | Good/fiber-tear | |
| Tack | Very slight-tack | | Good/No-tack | |

(a) Coating is applied by meyer rod and antilox roll
(b) Laboratory UV curing machine American Ultra Violet Company, Murray Hill, New Jersey is used for curing
(c) Cure speeds of 70 ft/min is used at 200 $mJ/cm^2$ with a 300 W tolamp.
(d) Coating weights ranging from 0.6 to 0.8 lbs/1000 sq. ft.
(e) Gloss values are from 80 to 95 units for 60 deg angle.
(f) Heat sealing is done at temperatures of 180° C. to 220° C., pressure of 40 to 70 psi, and a dwell time of 2 to 5 seconds.
(g) The plastic blister-cell interface temperature (for PVC) is about 95° C. to 100° C.

The invention claimed is:

1. A heat-sealable coating composition curable by actinic radiation comprising:
   a. 70 wt % to 99 wt % based on the total weight of said composition, a monomer mixture selected from a member of the group consisting of a monofunctional (meth) acrylate monomer, a multifunctional (meth)acrylate monomer, and mixtures thereof;
   b. 0.1 wt % to 30 wt % based on the total weight of said composition, a heat sealable resin selected from a member of the group consisting of a vinyl modified diene block copolymer, a diene block copolymer, a vinyl modified diene, and mixtures thereof, wherein said heat sealable resin is dissolved or finely dispersed in said monomer mixture; and
   c. 1 wt % to 30 wt % based on the total weight of said composition, at least one photoinitiator;
   wherein the monofunctional (meth)acrylate monomer is selected from a member of the group consisting of isobornyl acrylate, isobornylmethacrylate, isodecyl acrylate, isooctyl acrylate, isooctyl methacrylate, lauryl acrylate, lauryl methacrylate, octadecyl acrylate, stearyl acrylate, stearyl methacrylate, tetrahydrofuryl acrylate, tridecyl acrylate, phenoxyethyl methacrylate, methyl methacrylate, butyl acrylate, 2-phenoxyethyl acrylate, tridecyl methacrylate, and mixtures thereof; and
   wherein the said multifunctional (meth)acrylate monomer is selected from a member of the group consisting of 1,6-hexanediol diacrylate, tripropylene glycol diacrylate, trimethylolpropane tri(meth)acrylate, pentaerythritol triacrylate, pentaerythritol tri-tetraacrylate, ethyleneoxidetrimethyloipropane tri(meth)acrylate and mixtures thereof; and
   wherein the heat-sealable coating composition is coated and cured on a blister-board substrate to form a cured coating, and the cured coating is then heat-sealed under pressure and temperature to a blister-cell plastic,
   and wherein the composition comprises metal-oxide nanoparticles selected from a member of the group consisting of zinc oxide, titanium dioxide, magnetite, cerium oxide and mixtures thereof; and
   the metal-oxide nanoparticles are present in an amount from about 0.1 wt % to 3 wt % of the total weight of the heat-sealable coating composition.

2. The composition of claim 1 wherein the metal-oxide nanoparticles is zinc oxide.

3. The composition of claim 1 wherein the metal-oxide nanoparticles have a particle size less than 200nm.

4. The composition of claim 1 wherein the vinyl modified diene block copolymer has styrene contents from about 10 wt % to 50 wt % and vinyl contents from about 10 wt % to 70 wt %.

5. The composition of claim 4 wherein the vinyl modified diene block copolymer is present in an amount of about 0.1wt % to 30% wt % by weight of the total composition.

6. The composition of claim 1 wherein the blister cell is PVC, polyethylene terepthalate (PET), polyethylene terepthalate containing glycol (PET-G), PET/A, polyolefins such as polypropylene (PP) and polyethylene (PE), styrene and cellulose plastics and laminates of one more of these materials.

7. A method of making a heat sealable coating comprising:
   a. providing a composition of claim 1;
   b. contacting the composition with the blister-board substrate; and
   c. curing said composition by ultraviolet (UV) radiation.

8. The method of claim 7 wherein the composition contains 0.5 wt % to 15 wt % by weight of the total composition of heat sealable resin and 20wt % to 70wt % of the total composition of monofunctional monomer comprising isobornyl(meth) acrylate or isobornylacrylate.

9. The method of claim 8 further comprising heat sealing the cured coating composition with a blister cell.

10. The method of claim 9 further comprising adding metal-oxide nanoparticles to the composition of claim 1.

11. The method of claim 10 wherein, the metal-oxide nanoparticles are selected from a member of the group consisting of zinc oxide, titanium dioxide, magnetite, silicon dioxde, cerium oxide and mixtures thereof.

12. A methed of heat sealing an article comprising providing the composition of claim 1, curing said composition and heat sealing the cured composition to attach to the article.

13. The method of claim 12 wherein the heat sealing is performed in a temperature rang from about 180°C to 220°C, and pressures from about 40 to 70 psi.

14. The method of claim 13 wherein the heat sealing conditions are applied for a dwell time less than 2 seconds.

15. The method of claim 13 wherein heat sealing conditions are applied for a dwell time between 2 to 5 seconds.

16. An article formed by the method of claim 15, wherein the article is a blister-pack.

* * * * *